March 3, 1959
F. POHL
2,875,586
PURIFICATION OF VINYL CHLORIDE AND
A PROCESS RELATING THERETO
Filed Jan. 31, 1956
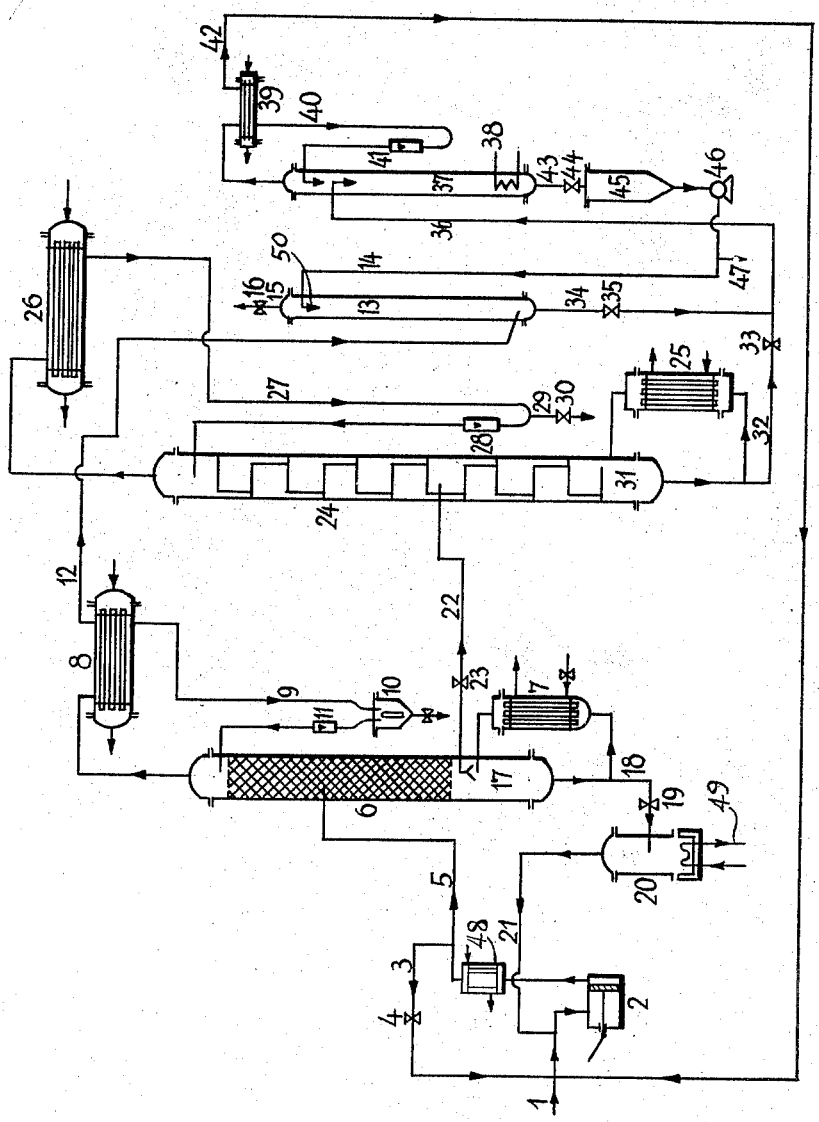
INVENTOR
FRANZ POHL
BY
his ATTORNEYS United States Patent Office 2,875,586
Patented Mar. 3, 1959

2,875,586
PURIFICATION OF VINYL CHLORIDE AND A PROCESS RELATING THERETO

Franz Pohl, Knapsack, near Koln, Germany, assignor to Knapsack-Griesheim Aktiengesellschaft, Knapsack, near Koln, Germany, a corporation of Germany Application January 31, 1956, Serial No. 562,561

Claims priority, application Germany February 9, 1955

15 Claims. (Cl. 62—12)

The present invention relates to improvements in the purification of vinyl chloride gas prepared from acetylene and hydrogen chloride, wherein pre-dried gaseous vinyl chloride contaminated by inert gases, acetylene and higher chlorinated acetylene derivatives is used as starting material.

In the known process for the preparation of vinyl chloride from acetylene and hydrogen chloride which is carried out, for example, in the presence of active carbon impregnated with mercury chloride, a gaseous vinyl chloride is formed which, generally, contains about 1 to 2 percent of inert gases, traces of acetylene and about 0.2 to 0.5 percent of higher chlorinated acetylene derivatives, especially 1.1-dichlorethane, in addition to about 5 to 10 percent of unreacted hydrogen chloride. The gas so obtained is freed from the hydrogen chloride by washing it with water and an alkali liquor.

By this process the above mixture of gases is saturated with water vapor. Since vinyl chloride can be worked up to form polyvinyl chloride only when present in an extremely pure and substantially dry form, it is necessary to free it from all its impurities. It is known art that these impurities are removed by subjecting the vinyl chloride to a drying process using, for example, caustic potash or caustic soda, and subsequently to a rectifying distillation in a so-called degassing column, in which the vinyl chloride used is freed from its low-boiling ingredients, and in a so-called vinyl chloride purifying column, in which the pure vinyl chloride is separated from the higher-boiling constituents.

It has already been proposed to perform these two distillation processes without application of pressure. Due to the low boiling point of vinyl chloride, which is about −10 to −11° C. this process was carried out at low temperatures. At such low temperature distillation, however, it is necessary to use very much and expensive refrigerating energy since, in addition to the energy required to liquefy the vinyl chloride, the total condensation energy required to bring about reflux must be used in form of expensive refrigerating calories at a temperature within the range of about −10 and −20° C. A further disadvantage of such distillation resides in the fact that in the course of time the condensers of the distilling columns become clogged by the deposition of ice; these cloggings are due to the fact that vinyl chloride has not been dried completely by a previous drying with alkali hydroxide.

It has also been proposed to liquefy vinyl chloride in a condenser with application of low temperatures; in this case, the liquefied vinyl chloride collected in a suction vessel is introduced by means of pressure pumps into distilling columns which are operated under such a high pressure that water can be used as cooling medium to bring about reflux. This process has the disadvantage that although the distillation itself is carried out under pressure a refrigerating device is necessary and that both the condensers for liquefying the vinyl chloride and the suction vessels are clogged by the deposition of ice. It is, therefore, necessary to use two condensers and two suction vessels which can be rinsed and defrosted and are capable of being used alternately.

Now I have found that these drawbacks inherent to the known processes can be avoided with advantage by proceeding as follows:

Crude vinyl chloride gas, i. e. vinyl chloride contaminated by inert gases, acetylene and higher chlorinated $C_2$-derivatives, which has been predried in a drying apparatus, for example with solid potassium hydroxide, is passed directly into the suction pipe of a compressor operating in the compression space without lubricating oil, for example a piston or a screw compressor, and is given therein a pressure of about 3 to 10 atmospheres (absolute), preferably about 4 to 7 atmospheres (absolute). The compression heat evolved is dissipated only to an extent such that no condensation occurs and the vinyl chloride gas leaves the compressor with a temperature of about 15 to about 90° C., preferably about 50 to about 70° C.; it is then introduced, while maintaining about that temperature, into the first distilling column (degassing column) which is operated under practically the same pressure as prevails in the compression space. Since vinyl chloride contains only minor proportions of dichlorethane and dichlorethylene, the partial pressure of which compounds is consequently low, these substances do not undergo condensation even at the temperatures applied. By maintaining a reflux in the degassing column, the vinyl chloride is freed from its low boiling proportions, i. e. inert gases and acetylene which in gaseous form escape from the condenser at the head of the column. The gases which escape from the gas chamber of the condenser which, advantageously, is operated at a temperature between about 0 and 30° C., are then introduced into a washing column likewise operated under about the pressure of the pressure side of the compressor; in this washing column vinyl chloride is washed out with at least one solvent, generally, with at least one chlorinated solvent which does not polymerize and boils at a higher temperature than vinyl chloride; for example chlorinated $C_1$ and $C_2$-compounds which may contain an olefinic bond may be used, such as trichlorethane, trichlorethylene, carbon tetrachloride, chloroform, methylene chloride, dichlorethane or dichlorethylene, or advantageously the isolated higher boiling impurities contained in the vinyl chloride used as starting material. The inert gases and acetylene are allowed to escape at the head of this washing column, it being of advantage to release these gases by means of a pressure regulating valve. Furthermore, it is possible to apply the following process steps either alone or in combination in addition to the process steps described above.

The product remaining in the sump (pit) of the first distilling column (degassing column) is distilled and the vinyl chloride obtained is recycled to the suction side of the compressor. The vinyl chloride which does not escape with the inert gases and the acetylene and remains in the first distilling column (degassing column) is withdrawn in gas form above the bottom of the column and introduced into another column in which a reflux of vinyl chloride is maintained and in which the pure vinyl chloride is obtained by distillation; this column, generally, is operated under a pressure which, suitably, is about 0.5 to 1 atmosphere below that of the degassing column. The product obtained in the sump of this second column is combined with the vinyl chloride containing product obtained in the washing column and then distilled; the gaseous vinyl chloride which escapes is recycled to the suction side of the compressor and the remaining higher boiling compounds which are substantially free from vinyl chloride are withdrawn and, if desired, recycled into the washing column.

As compared with the known methods of operating, the process of this invention offers the advantage to require only a compressor instead of a complete refrigerating device. Furthermore, it is not necessary according to this invention to usep umps and liquefaction condensers for vinyl chloride and suction vessels, so that no technical difficulties, interruptions and other disturbances occur which may be caused by the deposition of ice.

The moisture not retained by the predrying operation, using for example potassium hydroxide, is distilled over together with vinyl chloride at the head of the column in the form of an azeotropic mixture and separates as liquid water in the return pipe, where it is collected in a separator installed at that pipe and can then be easily removed. It has been found that the water can be completely separated in this manner, this being surprising.

The process of this invention offers the advantage that the gases which escape at the head of the degassing column and are not condensable under the distillation conditions and which, due to the partial pressure, contain up to 85 percent of vinyl chloride, can be withdrawn under a distillation pressure of about 3 to 10 atmospheres, preferably about 4 to 7 atmospheres. The vinyl chloride contained in the waste gases can be easily separated from the inert gases and acetylene by condensing it under pressure and at low temperatures, or still better by washing it under pressure, for example with dichlorethane, a by-product in the manufacture of vinyl chloride, and can then be recovered by simply removing it from dichlorethane by heating. If vinyl chloride is liquefied without application of pressure and at low temperatures as is the case in the known processes mentioned above, the major part of the inert gases is likewise obtained in admixture with about 85 percent of vinyl chloride under atmospheric pressure. If it is desired to recover such vinyl chloride by washing it with dichlorethane under atmospheric pressure, about 5 to 6 times the quantity of dichlorethane required in the process of this invention are necessary, if an additional compression of the waste gases shall be avoided.

The separation of the vinyl chloride from the higher boiling proportions and the recovery of pure vinyl chloride are performed in a distilling column (vinyl chloride purifying column) which, generally, is operated under a pressure which, suitably, is about 0.5 to 1 atmosphere below that of the degassing column, i. e. suitably at a pressure between 2 and 9.5 atmospheres (absolute) and, preferably at a pressure of at least 3 atmospheres (absolute) and at a temperature of at least 15° C. up to, for example, about 60° C. This step offers the advantage that it is not necessary to use a special feed pump for injecting the degassed vinyl chloride into the vinyl chloride purifying column. It has been found that substances which cannot be vaporized and polymers are formed in the sump of the degassing column, probably by the action of heat of the vinyl chloride vaporizer there installed upon the unpurified vinyl chloride. By transporting the liquid vinyl chloride from the sump of the degassing column into the vinyl chloride purifying column, these solid substances would be dragged along and in the course of time would cause cloggings and thus interruptions of work.

In order to avoid these difficulties according to the present invention the vinyl chloride is removed from the degassing column in the form of a gas above the bottom and introduced into the vinyl chloride purifying column. The concentration of the solid particles enriching in the sump of the degassing column must be kept at a low rate, since there is the risk that these particles deposit at the surfaces of the vaporizer. This can be attained suitably by continuously or periodically discharging part of the liquid sump at the bottom of the degassing column into a vessel that can be easily cleaned and in which the vinyl chloride which has been removed is vaporized for example under atmospheric pressure. The vaporized vinyl chloride is recycled to the suction side of the compressor. The gaseous transport of the vinyl chloride from the degassing column to the vinyl chloride purifying column on the one hand, and preferably the periodic discharge of the solid particles, on the other hand, provide for an easily controllable, simple and undisturbed operation of the two columns.

As has already been mentioned above, in the process according to this invention the compression heat set free in the compressor is eliminated only to an extent such that no condensation occurs and the vinyl chloride gas possesses a specific heat of about 15 to 90° C., preferably about 50 to 70° C. This step should be understood so that the temperature of the gas can be almost reduced to the temperature where the gas is liquefied, which temperature depends on the pressure applied. If a pressure of 3 atmospheres is applied, it is possible to reduce the temperature to about 15° C., at 4 atmospheres to about 25° C., at 7 atmospheres to about 50° C. and at 10 atmospheres to about 65° C. As is understood, in practice endeavors should be made to cool the gas only to an extent such that its temperature still is some degrees centigrade above its liquefying temperature suitably at least 10° C.

An apparatus suitable for use in carrying out the process of this invention is illustrated diagrammatically by way of example in the accompanying drawing:

Pre-dried vinyl chloride gas containing the aforesaid impurities is transported in constant quantities through conduit 1 to the suction side of compressor 2 which is operated in the compression space without lubricating oil and by which the gas introduced is compressed to, for example, about 5–6 atmospheres, whereby it is simultaneously heated. The cooler 48 or transmission in pipe 5 eliminates part of the heat of compression and obtains a temperature of, for example, 50–60° C., i. e., a temperature above the condensation temperature. Through pipe 3 and by means of valve 4 the suction pressure prevailing in the suction pipe is adjusted in the usual manner to the desired level of superatmospheric pressure with respect to the outside atmosphere, for example a superatmospheric pressure corresponding to 10 mm. of mercury, and the pressure prevailing in pipe 5 is controlled by means of regulating valve 4. The compressed and heated gas then passed immediately through pipe 5 into degassing column 6 which is under pressure. By heating vaporizer 7, for example with low pressure steam, and cooling condenser 8 with cooling water, for example to a temperature of about 15–20° C., a reflux is produced in the column which consists substantially of vinyl chloride, which reflux is communicated to the top of degassing column 6 through return pipe 9, separator 10 and volumenometer 11. The water which separates in reflux pipe 9 can be withdrawn at the bottom of the separating device 10. The inert gases and acetylene which have not been liquefied in the condenser which, corresponding to the partial pressure, contain about 85 percent of vinyl chloride leave condenser 8 through pipe 12 and are introduced at the bottom into extraction column (washing column) 13 which is about under the same pressure as the degassing column 6; said column is charged from above by means of pipe 14 with a higher boiling compound, for example, substantially with dichlorethane. The inert gases and acetylene which have been freed from the vinyl chloride leave the top end of extracting column 13 through pipe 15 and pressure control valve 16. By means of pressure control valve 16 the total pressure in the system, i. e. the pressure prevailing behind compressor 2 is controlled and kept constant. The liquid sump of vinyl chloride containing solid polymerization particles at the bottom 17 of column 6 is partially released either continuously or periodically by means of pipe 18 and discharge valve 19 into purifying container 20 which can be easily opened and cleaned and is heated at the bottom, for example, by means of steam in a reboiler coil as shown at 49. The vinyl chloride is vaporized in said container for example without application of pressure, and recycled through pipe 21 to the suction side of compressor 2, whereas the solid particles remain in container 20 and can be withdrawn periodically by opening said container. The major part of the vinyl chloride which has been freed in column 6 from the inert gases and acetylene is transported in gaseous form through pipe 22 and control valve 23 (which serves to control the transported quantity of gas) directly into vinyl chloride purifying column 24, which is operated at a pressure which, suitably, is about 0.5 to 1 atmosphere below that of the degassing column. By heating vaporizer 25, preferably by means of low pressure steam or warm water, and cooling condenser 26 with cooling water to a temperature of, for example, 20° C., a reflux of vinyl chloride is produced in vinyl chloride purifying column 24, which is communicated to the head of this column through pipe 27 and reflux volumenometer 28. From pipe 29 and valve 30 pure liquid vinyl chloride is withdrawn. From sump 31 of column 24 high boiling impurities, especially 1,1-dichlorethane in admixture with vinyl chloride, for example about 40 to 50 percent, is withdrawn through pipe 32 and discharge valve 33. This mixture is combined with the mixture obtained in washing column 13, after the latter which likewise consists substantially of dichlorethane and vinyl chloride has been passed through pipe 34 and discharge valve 35. The combined mixtures so obtained are introduced through injecting pipe 36 into column 37 in which vinyl chloride is eliminated and which is operated, for example, without application of pressure or at a slight super-pressure of, for example, 3 atmospheres. In this column a reflux is produced by heating with heating device 38, for example with low pressure steam, and cooling the condenser 39 with cooling water to a temperature of, for example, about 20° C.; the reflux so produced is then communicated to the head of column 37 by means of pipe 40 and reflux volumenometer 41. From the gas chamber of condenser 39, the uncondensed vinyl chloride, which substantially contains only minor portions of dichlorethane, is withdrawn in gaseous form by passing through line 42 and recycled to the suction side of compressor 2. At the bottom of column 37 the high boiling by-products which are free from vinyl chloride, i. e. especially 1,1-dichlorethane in addition to small amounts of 1,1-dichlorethylene and other higher chlorinated $C_2$-derivatives, are withdrawn by means of pipe 43 and discharge valve 44 and transported to container 45. A part of these high boiling products is transported from container 45 by means of pressure pump 46 and through pipe 14 to extracting column 13 at 50 in order to separate vinyl chloride from the inert gases, whereas the quantity of these by-products not needed for said purpose is withdrawn through pipe 47.

I claim:

1. A process for the purification of vinyl chloride obtained from acetylene and hydrogen chloride, by pressure distillation, which comprises compressing in the absence of lubricating oil a crude pre-dried gaseous vinyl chloride contaminated by inert gases, acetylene and higher chlorinated $C_2$-derivatives to a pressure of about 3 to 10 atmospheres, dissipating the compression heat evolved to an extent such that no condensation occurs, then introducing the gaseous vinyl chloride having a temperature between about 15 to 90° C. under substantially the same pressure into a first distillation column, separating the low boiling contaminations in said distillation column by allowing said contaminations to escape at the top of the column under substantially the same pressure into a washing column, washing out in said washing column the vinyl chloride which has escaped with said low boiling contaminations with at least one solvent which does not polymerize and has a boiling point which is higher than that of vinyl chloride, allowing the inert gases to escape, withdrawing the vinyl chloride from which the inert gases and acetylene are separated in the first distillation column above the sump of said first distillation column, leading it into a second distillation column operating with a reflux, and separating the pure vinyl chloride in said second distillation column from the high boiling contaminations by distillation.

2. A process as claimed in claim 1, wherein the second distillation column is operated at a pressure which is about 0.5 to 1 atmosphere below that which prevails in the first distillation column.

3. A process for the purification of vinyl chloride obtained from acetylene and hydrogen chloride, by pressure distillation, which comprises compressing in the absence of lubricating oil a crude pre-dried gaseous vinyl chloride contaminated by inert gases, acetylene and higher chlorinated $C_2$-derivatives to a pressure of about 3 to 10 atmospheres, dissipating the compression heat evolved to an extent such that no condensation occurs, then introducing the gaseous vinyl chloride having a temperature between about 15 to 90° C. under substantially the same pressure into a first distillation column, separating the low boiling contaminations in said distillation column by allowing said contaminations to escape at the top of the column under substantially the same pressure into a washing column, washing out in said washing column the vinyl chloride which has escaped with said low boiling contaminations with at least one solvent which does not polymerize and has a boiling point which is higher than that of vinyl chloride, allowing the inert gases to escape, separating a part of the products obtained in the sump of the first distillation column, distilling these products in a separate distillation apparatus, returning the vinyl chloride obtained from said sump product to the suction side of the compressor, withdrawing the vinyl chloride from which the inert gases and acetylene are separated in the first distillation column above the sump of said first distillation column, leading it into a second distillation column operating with a reflux, and separating the pure vinyl chloride in said second distillation column from the high boiling contaminations by distillation.

4. A process as claimed in claim 3, wherein the sump product of the second distillation column is combined with the vinyl chloride containing product of the washing column and distilled in a further column, and wherein the gaseous vinyl chloride escaping from said further column is returned to the suction side of the compressor and the residue of the separate column which is substantially free from vinyl chloride and consists of higher-boiling compounds is withdrawn.

5. A process as claimed in claim 4, wherein a part of the higher boiling compounds obtained in said further column is returned into the washing column.

6. A process for the purification of vinyl chloride obtained from acetylene and hydrogen chloride, by pressure distillation, which comprises compressing in the absence of lubricating oil crude pre-dried gaseous vinyl chloride mixture including inert gases, acetylene and higher chlorinated $C_2$-derivatives to a pressure of about 3 to 10 atmospheres absolute, dissipating heat of compression without condensing any fraction of said mixture to obtain a mixture at a temperature between about 15 to 90° C., introducing resulting mixture under substantially the same pressure into a distillation column, removing under substantially the same pressure, inert gases and acetylene containing minor proportions of vinyl chloride as overhead from said column, separating high boiling contaminants as liquid bottoms and withdrawing vinyl chloride at a point intermediate the top and bottom of said column.

7. The process as set forth in claim 6 wherein the overhead containing minor proportions of vinyl chloride is washed with at least one solvent for vinyl chloride which does not polymerize and has a boiling point which is higher than that of vinyl chloride to recover vinyl chloride-solvent solution.

8. The process as set forth in claim 7 in which recovered vinyl chloride-solvent solution is distilled to recover vinyl chloride and recovered vinyl chloride is recycled as feed for the step of compressing.

9. The process as set forth in claim 6 wherein overhead containing minor proportions of vinyl chloride is conducted through a condenser which is operated at a temperature of between about 0 and 30° C. and liquid condensate therefrom is recycled to said column as reflux.

10. The process as set forth in claim 6 wherein the crude pre-dried vinyl chloride mixture is compressed to a pressure of about 4 to 7 atmospheres absolute.

11. The process as set forth in claim 6 wherein the compression heat is dissipated to such an extent that the compressed vinyl chloride mixture has a temperature between about 50 and 70° C.

12. The process as set forth in claim 6 wherein the overhead containing minor proportions of vinyl chloride is washed with at least one chlorinated hydrocarbon of a hydrocarbon selected from the group consisting of methane, ethane, and ethylene.

13. The process as set forth in claim 6 wherein the overhead containing minor proportions of vinyl chloride is washed with a mixture consisting of liquid chlorinated hydrocarbons other than vinyl chloride obtained as process by-products.

14. The process as set forth in claim 6 in which liquid bottoms are distilled for the recovery of vinyl chloride, and recovered vinyl chloride is recycled as feed for the step of compressing.

15. The process as set forth in claim 6 in which the vinyl chloride gas withdrawn from the distillation column is conducted to another distillation column and further purified by distillation.

References Cited in the file of this patent

UNITED STATES PATENTS

| | | |
|---|---|---|
| 2,230,219 | Carey | Feb. 4, 1941 |
| 2,407,039 | Stanley | Sept. 3, 1946 |
| 2,480,021 | Hillyer | Aug. 23, 1949 |
| 2,531,361 | Padgitt | Nov. 21, 1950 |
| 2,571,329 | Berg | Oct. 16, 1951 |
| 2,610,704 | Patterson | Sept. 16, 1952 |
| 2,722,113 | Deming | Nov. 1, 1955 |
| 2,744,394 | Newton | May 8, 1956 |
| 2,762,850 | Lenz | Sept. 11, 1956 |
| 2,765,635 | Redcay | Oct. 9, 1956 |

FOREIGN PATENTS

| | | |
|---|---|---|
| 630,248 | Great Britain | Oct. 10, 1949 |
| 635,013 | Great Britain | Mar. 29, 1950 |